United States Patent Office 3,759,738
Patented Sept. 18, 1973

3,759,738
GRAFT POLYMERIC SUBSTRATE
Teruyuki Misumi, Yokohama, Hirotsugu Miyauchi, Tokyo, Sakae Tsushima, Kawasaki, and Kunihiko Takeda and Toshio Miyaji, Yokohama, Japan, assignors to Asahi Kasei Kogyo Kabushiki Kaisha, Osaka, Japan
Filed Apr. 10, 1970, Ser. No. 27,433
Claims priority, application Japan, Apr. 26, 1969, 44/31,986
Int. Cl. B44d 1/50
U.S. Cl. 117—93.31                    14 Claims

ABSTRACT OF THE DISCLOSURE

Graft polymeric substrate especially suitable for basic matrix for an ion-exchange membrane, which is superior in electrochemical as well as mechanical properties. The substrate is composed of resin of three dimensional net work structure and a woven fabric substance which in itself had free spaces of substantially uniform size in an amount of 20%–80% by volume, said resin closely filling the free space portions of the woven fabrics and being firmly bonded to the fabrics by graft polymerization. Water leakage is substantially zero cc./m.$^2$ hr. under 0.5 kg./cm.$^2$ differential pressure.

---

Figure 1:
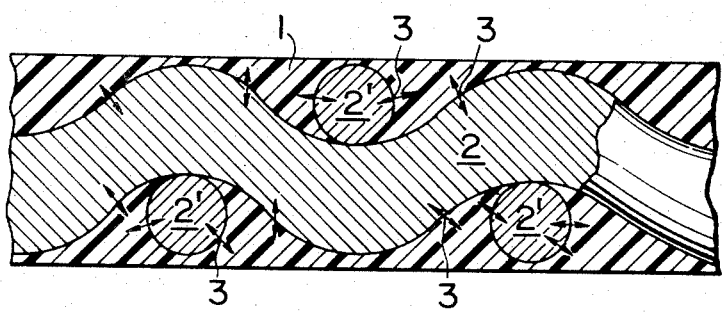

This invention relates to a graft polymeric substrate wherein a resin portion, which is a high molecular polymer having a three-dimensional net work structure, has been firmly bonded by graft polymerization to a cloth-like substance, which is a support. The graft polymeric substrate of the present invention is particularly useful as a basic polymer matrix suitable for preparation of an ion-exchange membrane, which is required to have both electrochemical and mechanical properties of extremely high degree. Heretofore, there have been revealed many patents and literature references which are concerned not only with basic high molecular matrixes suitable for production of ion-exchange membranes but also with ion-exchange membranes themselves. However, there have not yet been provided any substrates which, when formed into membranes, are excellent in such electrochemical properties as ion selective permeability and electric resistance and in such mechanical properties as strength, softness and dimensional stability. That is, as ion-exchange membranes, there have heretofore been known those in which a cloth-like substance is used as the support. The use of a support greatly contributes to the improvement of the resulting membrane in strength, dimensional stability and the like mechanical properties. However, a cloth-like substance, which is ordinarily used as the support, has no ion-exchange capacity, in most cases, and hence undesirably increases the electric resistance of the resulting ion-exchange membrane. This kind of ion-exchange membrane is not sufficient in bonding strength between the support and the resin portion, and therefore the resin portion is peeled off from the support owing to swelling or shrinking of the resin portion, with the result that the membrane is broken. Even when left unbroken, the membrane is often increased, after a long run, in water permeability and/or degraded in ion selective permeability. In order to bond the support more firmly to the resin portion, there has been proposed a process in which is used as the support a polyolefinic support which has been subjected to halogenation treatment. Even when such halogenation treatment is adopted, however, the support cannot be strongly bonded to the resin portion, and the bonding is not sufficiently chemically stable. Accordingly, splitting or peeling takes place between the support and the resin portion owing to chemical treatments carried out during preparation of the membrane. Further, in the case where the membrane is in use, the same phenomenon as above is also brought about owing to the drying, swelling or shrinking of the membrane or to the influence of strong alkali.

There have also been known graft polymeric substrates prepared by treating such film-like supports as thin films, thin plates or sheets with high energy ionizing radiation, thereby graft polymerizing monomers having functional groups capable of introducing ion-exchange groups. In the case of such substrates, however, the film-like substances, which are used as the supports, also undergo graft polymerization to give inseparable composite, unitary graft polymeric substrates. Accordingly, the substrates are improved in such mechanical properties as strength, softness and the like, but are not always satisfactory in such mechanical and electrochemical properties as dimensional stability, ion selective permeability, electric resistance and the like.

An object of the present invention is to provide a high molecular substrate capable of satisfying both the said electrochemical properties and mechanical properties.

Another object of the invention is to provide a graft polymeric substrate suitable for production of an ion-exchange membrane which is composed of a support and a resin portion, said support and resin portion having been firmly bonded to each other by graft polymerization.

Figure 2:
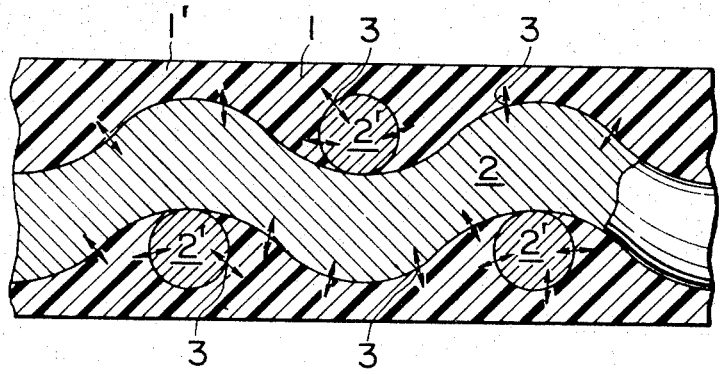

In the accompanying drawings, FIGS. 1 and 2 schematically show the cross sections of the present substrates. In the drawings, 1 and 1' show resin portions, 2 and 2' show supports, and 3 shows a portion at which the resin and the support have been graft polymerized. As seen in FIG. 1, the resins 1 and 1' have filled completely intimately at least the space portions of the supports. Further, both the upper and lower parts of the space portions may have been covered with the resin 1', as seen in FIG. 2.

The substrate of the present invention is such a polymeric substrate that the space portion (A) of the support, in which spaces substantially equal in size had been distributed substantially uniformly, has been filled with a resin (B) having a three-dimensional structure. The resin is derived from (1) a monomer having an ion-exchange group and/or a functional group capable of introducing an ion-exchange group after polymerization and (2) a crosslinking agent. The volume of (A) is substantially equal to that of (B). The support and the resin have been firmly bonded to each other by graft polymerization. As the result, the present substrate gives a membrane having such properties that:

(a) Water permeability thereof after introduction of an ion-exchange group under a differential pressure of 0.5 kg./cm.$^2$ is substantially 0 cc./m.$^2$ hr., (b) Specific conductance thereof after introduction of ion-exchange group is $0.5$–$20 \times 10^{-3}$ $\Omega^{-1}$ cm.$^{-1}$, and (c) Bursting strength thereof after introduction of ion-exchange group is 1–10 kg./cm.$^2$.

The above-mentioned properties (a), (b), (c) and (d) do not change, in practice, even when the membrane has been subjected to test carried out continuously for 6 months under such condition as $\alpha$ or $\beta$ set forth below (hereinafter this test is referred to as "6 months' continuous static hydraulic differential pressure test"), and to test carried out continuously for 6 months while switching every other day the condition $\alpha$ to the condition $\beta$ (hereinafter this test is referred to as "6 months' continuous recycle test").

|   | One side of the membrane (kg./cm.$^2$) | The other side of the membrane (kg./cm.$^2$) |
|---|---|---|
| $\alpha$ | 0.5 | 0 |
| $\beta$ | 0 | 0.5 |

The support (3) employed in the present invention may be in any of such forms as fiber cloths, woven fabrics such as nets and the like in which spaces substantially equal in size have been distributed uniformly. Free space content of the support before polymerization is from 10% to 90% by volume. After the polymerization, the free space is filled with resin and the resin portion is about 20 to 80% by volume, because the supports expand owing to graft polymerization. Supports having such forms can easily give polymeric substrates without being injured not only in the mechanical properties thereof but also in the electrochemical properties of resin portions.

The free space content referred to herein signifies the ratio of the volume of the portion in which is present no substrate constituting the cloth-like substance (i.e., the space portion) to the apparent volume of the cloth-like substance which is calculated from the apparent thickness, width and length of the said substance.

As the material of the support, there is used a polymerization product of at least one monomer selected from the group consisting of olefinic monomers such as ethylene, propylene and butene; halogenated vinyl monomers such as vinyl chloride, vinylidene chloride and vinyl tetrafluoride; monomers having acid ester groups such as ethyl acrylate and methyl methacrylate; styrene derivatives; and monomers having nitrile groups such as acrylonitrile and methacrylonitrile. Alternatively, there may be used polyvinyl alcohol, polyamide, or polyester. Further, mixtures of the above-mentioned substances can also be used. In short, the material of the support may be any of high molecular substances which, when irradiated with a high energy ionizing radiation, can provide active centers capable of bringing about graft polymerization.

The individual components constituting the resin portion in the substrate of the present invention are explained below.

(1) Monomer having an ion-exchange group and/or having a functional group capable of introducing an ion-exchange group after polymerization This monomer is at least one member selected from the group consisting of monovinyl aromatics such as styrene, vinyltoluene and haloalkylstyrenes; ethylenically unsaturated sulfonic acids and derivatives thereof such as vinylsulfonic and styrenesulfonic acids and salts, esters and amides of said acids; ethylenically unsaturated carboxylic acids and derivatives thereof such as acrylic, methacrylic, maleic, fumaric, vinyl-benzoic and itaconic acids and salts, esters and amides of said acids; nitrogen-containing vinyl monomers such as vinylpyridine, vinylimidazole, vinylpiperidine and vinylaniline; and related substances thereof that have a weakly anion-exchange group or can be converted into a strongly anion-exchange group by alkylation or quaternarization.

(2) Crosslinking agent

The crosslinking agent is at least one member selected from the group consisting of polyvinyl compounds such as, for example, divinylbenzene, trivinylbenzene, divinylnaphthalene, and butadiene.

In embodying the present invention, the components (1) and (2) are used, if necessary, in combination with the substance (4) or (6) set forth below.

(4) Monomer copolymerizable with the aforesaid components (1) and (2)

This monomer is suitably selected from such monovinyl compounds and/or monovinylidene styrene, vinyltoluene, vinylnaphthalene, acrylonitrile, vinyl acetate, vinyl halides and esters of acrylic and methacrylic acids.

(5) Polymerization catalyst

The polymerization catalyst is selected from such vinyl polymerization catalysts as benzoyl peroxide, lauroyl peroxide, dichlorobenzoyl peroxide and the like organic peroxides; hydrogen peroxide, potassium persulfate, ammonium persulfate and the like peroxides; and azobisisobutyronitrile and the like azobisnitriles. Further, dialkylamines, pyridines and the like radical polymerization cocatalysts may also be used.

(6) Plasticizer and other additives

As these additives, there are used such various substances as mentioned below.

(a) A linear high molecular substance soluble in a monomer mixture composed mainly of the aforesaid components (1), (2), (4) and (5). Examples of such substance include polystyrene, styrene-butadiene copolymer, polybutylene, natural rubber, chlorosulfonated polyethylene and chlorinated polypropylene.

(b) A fine granular high molecular substance capable of swelling in a monomer mixture composed mainly of the aforesaid components (1), (2), (4) and (5). Examples of such substance include polyvinyl chloride, vinyl chloride-vinyl acetate copolymer, polyethylene, ethylene-vinyl acetate copolymer and polypropylene.

(c) A plasticizer and a solvent which are added in order to facilitate the introduction of ion-exchange group and the like procedure. Examples of the plasticizer include dimethyl phthalate, dioctyl phthalate and the like phthalates, tricresyl phosphate and the like phosphates, and polyglycol esters. Examples of the solvent include benzenes, mono- and poly-hydric alcohols, dioxane, dialkyl ethers and the like ethers, ketones, mono- and poly-halogenated alkyls, and dimethylformamide, which are miscible with the monomers (1), (2) and (4).

As mentioned previously, the substrate of the present invention is such a polymeric substrate that the space portion (A) of the support, in which spaces substantially equal in size have been distributed substantially uniformly, has been filled with the resin (B) having a three-dimensional structure which has been derived from a monomer having a functional group capable of introducing an ion-exchange group and a crosslinking agent. The amount of (A) is substantially equal to that of (B). In case the third monomer has been added, the present substrate has such a structure that the monomer having a functional group capable of introducing an ion-exchange group, the crosslinking agent and the above-mentioned third monomer have been graft polymerized onto the support. In the present substrate, the resin portion and the support have been bonded to each other quite firmly and in a stable state by means of a covalent bond. Moreover, there is no dislocation in chemical structure between the support and the resin portion. Accordingly, the present substrate is excellent in mechanical properties. Further, in addition to the excellent electrochemical properties of the resin portion, the decrease in electric resistance of the substrate is made possible since an ion-exchange group can be introduced also into the support. Thus, the present support is a novel support which is preferable as a basic high molecular matrix suitable for production of an ion-exchange membrane markedly excellent in electrochemical and mechanical properties. A substrate prepared by use of 2 or more supports is also involved in the scope of the present invention so far as at least one support has such a graft polymeric structure as mentioned previously.

The present substrate can be prepared according to a variety of processes. Typical examples of such processes are as set forth below.

A mixture comprising the aforesaid components (1) and (2) is charged, if necessary, with the third monomer (4) copolymerizable therewith, the polymerization catalyst (5) and the plasticizer (6). The mixture is coated on the aforesaid support (3). The support has been shaped into a membrane-like substance and has 10–90% by volume of free space content. The coated support is subjected to polymerization reaction with irradiation of a high energy ionizing radiation such as δ-ray, β-ray, α-ray, X-ray, high speed electron ray or ultraviolet ray. Alternative process is that the support is previously irradiated with radiation, and then immersed in or coated with the above-mentioned mixture and subjected to polymerization. These two processes may be employed in combination.

In the former process, the support, which has previously been degasified, may be impregnated with the monomer mixture which has also been degasified, or the support is immersed in the monomer mixture and completely degasified and the thus treated support is shaped into the form of a membrane. When the support is irradiated with high energy radiation, the graft polymerization of the monomer mixture onto the support and the polymerization between the monomers are effected simultaneously at the time of irradiation. If necessary, the treated support may be heated after the irradiation to terminate the polymerization reaction.

In the latter process, the irradiation is conveniently effected in air, but may also be carried out in vacuum or in an inert gas. Immediately after the irradiation, or after a definite period of time (ordinarily within several ten days), e.g. 20, from the irradiation, the support is coated with or immersed in the monomer mixture shaped into the form of a membrane and then subjected to thermal polymerization.

The dose of the high energy ionizing radiation to be irradiated varies depending on the thermal polymerizability of the monomer mixture, the activity and amount of a catalyst, if this is used, and the temperature of polymerization for membrane formation, but may be suitably selected according to the ratio of the rate of graft polymerization between the support and the resin portion to the rate of polymerization between monomers employed to constitute the resin portion. Ordinarily, the dose of the high energy ionizing radiation is less than $15 \times 10^6$ rad.

As a process for introducing ion-exchange groups which is to be adopted in producing ion-exchange membranes by use of the present substrates, there may be adopted any of the prior art processes, such as a process for introducing sulfonic acid groups by using concentrated sulfuric acid, chlorosulfonic acid, sulfuric anhydride or an adduct of sulfuric anhydride and dioxane as a sulfonating agent; a process in which the substrates are haloalkylated and then aminated with a tertiary amine to introduce quaternary ammonium groups; a process in which the ester or amide groups of the substrates are hydrolyzed to introduce sulfonic or carboxylic acid groups; or a process in which the primary, secondary or tertiary amino groups of the substrates are quaternarized with halogenated alkyls or the like.

The examples set forth below illustrate in detail the graft polymeric substrates of the present invention and show experimental results obtained in the case where the substrates, after introduction of ion-exchange groups, were used as ion-exchange membranes. Parts are referred to by weight, if not otherwise defined.

EXAMPLE 1

An 80 mesh cloth (free space content 55%), which had been woven from 40 denier polypropylene monofilaments, was irradiated in air at room temperature for 5 hours with Cl 60 at a dose rate of $1 \times 10^4$ rad./hr.

Separately, 38 parts of divinylbenzene (purity 55%), 70 parts of 2-vinyl-5-ethylpyridine, 60 parts of styrene, 20 parts of dimethyl phthalate and 0.2 part of benzoyl peroxide were formed into a homogeneous solution to prepare a mixed monomer liquid. This monomer liquid has filled in a chromium-plated square polymerizer. In this liquid was immersed a composite formed by laminating cellophane paper, the aforesaid polypropylene cloth and cellophane paper, in this order. After removing air within the cloth and between the laminated materials, the composite was brought into a state pressed between two glass plates. Subsequently, the composite was thermally polymerized at 40° C. for 10 hours and then at 95° C. for 10 hours to form a membrane-like graft polymeric substrate having the polypropylene cloth as support. After cooling the thus treated composite, the cellophane papers were peeled off and the dimethyl phthalate was removed by extraction with acetone to obtain a membrane-like graft polymeric substrate.

The thus obtained polymeric substrate was such that the space portion (A) of the polypropylene cloth had been filled with a three-dimensional structure resin (B) derived from the monomers having functional groups capable of introducing ion-exchange groups and from the crosslinking agent, wherein the volume of (A) was substantially equal to that of (B). This substrate was quaternarized with an acetone solution containing 30% of methyl iodide to prepare an anion-exchange membrane. The thus prepared membrane had a thickness of 0.19 mm. and showed, in 0.5 N NaCl at 25° C., (a) no water leakage under a static hydraulic differential pressure of 0.5 kg./cm.², (b) the required specific conductance heretofore described and (c) a bursting strength of 7.0 kg./cm.². The above-mentioned properties (a), (b) and (c) did not substantially change even after 6 months' continuous static hydraulic differential pressure test and 6 months' continuous recycle test.

For comparison, a membrane was prepared under entirely the same conditions as above, except that the polypropylene cloth was not irradiated. This membrane had, immediately after preparation, a thickness of 0.17 mm. and showed the required specific conductance and a water leakage of 1000 cc./m.² hr. The electroconductivity and bursting strength of the membrane did not substantially change even after 6 months' continuous static hydraulic differential pressure test and 6 months' continuous recycle test, but the water leakage thereof increased to 2–5 times after 6 months' continuous static hydraulic differential pressure test, and increased to 8–12 times after 6 months' continuous recycle test. Further, a continuous crack was observed between the support and the resin portion.

EXAMPLE 2

To a mixture comprising 70 parts of divinylbenzene (purity 55%), 130 parts of styrene and 1 part of di-tert.butyl peroxide was added a solution of 6 parts of styrene-butadiene copolymer in 70 parts of dioctyl phthalate to prepare a mixed monomer liquid in the form of a homogeneous solution.

Using the same irradiated polypropylene cloth as in Example 1, a composite was formed in the same manner as in Example 1. The thus formed composite was immersed in the above-mentioned mixed monomer liquid and thermally polymerized, in a state shaped into the form of a membrane, at 60° C. for 15 hours, at 80° C. for 20 hours and at 90° C. for 20 hours. After cooling, the composite was treated in the same manner as in Example 1 to obtain a membrane-like graft polymeric substrate. This substrate was such that the space portion of the polypropylene cloth had been filled with a three-dimensional structure resin having ion-exchange groups. The thus obtained graft polymeric substrate was immersed in methanol and then sulfonated with concentrated sulfuric acid (98%) at 50° C. for 10 hours to prepare a cation-exchange membrane. This membrane had a thickness of 0.2 mm. and showed, in 0.5 N NaCl at 25° C., (a) the required specific conductance, (b) no water leakage under a static hydraulic differential pressure of 0.5 kg./cm.² and (c) a bursting strength of 6.0 kg./cm.².

The above-mentioned properties (a), (b) and (c) did not substantially change even after 6 months' continuous static hydraulic differential pressure test and 6 months' continuous recycle test.

For comparison, a membrane was prepared under entirely the same conditions as above, except that the polypropylene cloth was not irradiated. This membrane had the required specific conductance, but the water leakage thereof was 4000 cc./m.² hr. and a continuous crack was observed between the support and the resin portion. Further, the water leakage of the membrane increased to 10–15 times after 6 months' continuous static hydraulic differential pressure test and 6 months' continuous recycle test.

EXPERIMENTAL EXAMPLE 1

In order to measure the practical efficiencies of the ion-exchange membranes obtained in Examples 1 and 2, there were adopted such procedures as mentioned below.

The multi-compartment electrodialysis apparatus was constructed by using each 20 sheets of the anion- and cation-exchange membranes of 10 cm. x 20 cm. in effective electrodialysis area. To this apparatus was applied a direct current of 8 a., while introducing into the diluting chambers sea water of 0.5 N chloride ion concentration at 25° C. and at a flow rate of 5 cm./sec., and the amount and concentration of osmotic liquid overflowed from the concentrating chambers were measured to calculate the concentration of the concentrating chamber liquid and the current efficiency of the total ion.

As the result, the concentrating chamber liquid concentration (total ion) was 4.30 N and the current efficiency (total ion) was 90%. These efficiencies did not change even after 6 months' continuous electrodialysis resistance test.

On the other hand, the control ion-exchange membranes prepared for comparison in Examples 1 and 2 from the graft polymeric substrates using the un-irradiated polypropylene cloth were used under the same conditions as above. In this case, the concentration and amount of the concentrating chamber liquid were unstable and the liquid concentration did not reach but at most 3.20 N (total ion concentration).

EXAMPLE 3

A 60 mesh plain cloth (free space content 75%), which had been woven from 40 denier polyacrylonitrile multi-filaments, was irradiated with Co 60 at a total dose of $1 \times 10^6$ rad. In the same manner as in Example 1, the thus irradiated cloth was formed into a composite, which was then immersed in a homogeneous mixed solution comprising 40 parts of divinylbenzene (purity 55%), 60 parts of styrene, 40 parts of dimethyl phthalate and 0.2 part of benzoyl peroxide. Thereafter, the composite was polymerized at 45° C. for 20 hours, at 70° C. for 20 hours and at 90° C. for 20 hours. After cooling, the composite was treated in the same manner as in Example 1 to prepare a membrane-like graft polymeric substrate. This substrate was such that the space portion of the support had been completely filled with a three-dimensional structure resin having functional groups capable of introducing ion-exchange groups.

The thus prepared graft polymeric substrate was sulfonated at 7° C. for 80 hours in a dichloroethane solution saturated with a sulfuric anhydride-dioxane adduct to obtain a cation-exchange membrane. This membrane had a thickness of 0.16 mm. and showed, in 0.5 N NaCl at 25° C., (a) the required specific conductance, (b) no water leakage under a static hydraulic differential pressure of 0.5 kg./cm.², (c) a bursting strength of 10 kg./cm.² and (d) a transport number from the membrane potential of 99.5%. These properties (a), (b), (c) and (d) did not change even after 6 months' continuous static hydraulic differential pressure test and 6 months' continuous recycle test.

For comparison, a membrane was prepared under the same conditions as above, except that the cloth was not irradiated. This membrane showed the required specific conductance and a water leakage of 1500 cc./m.² hr., and was not practically usable.

EXAMPLE 4

A 150 mesh cloth (free space content 50%), which had been woven from 20 denier polypropylene monofilaments, was irradiated with a resonnace transformer type electron accelerator at a total dose of $1 \times 10^6$ rad at an acceleration voltage of 2 mev. and a tube current of 1 ma.

On the other hand, there was prepared a paste-like mixed monomer liquid comprising 20 parts of divinylbenzene (purity 55%), 30 parts of 4-vinylpyridine, 50 parts of styrene, 15 parts of dioctyl phthalate, 0.5 part of benzoyl peroxide and 45 parts of fine polyvinyl chloride powder. This mixed monomer liquid was uniformly coated on the aforesaid electron irradiated polypropylene cloth, which was then inserted between two polyester films to form a composite. The thus formed composite was pressed between two glass plates and then thermally polymerized at 80° C. for 2 hours, at 45° C. for 6 hours and at 80° C. for 24 hours. After cooling, the thus treated composite was treated in the same manner as in Example 1 to obtain a membrane-like graft polymeric substrate. This substrate was such that the space portion of the support had been filled with a three-dimensional structure resin. The substrate was quaternarized with methyl iodide to obtain an anion-exchange membrane. The thus obtained membrane had a thickness of 0.15 mm. and showed, in 0.5 N NaCl at 25° C., (a) a specific conductance of $4 \times 10^{-3}$ $\Omega^{-1}$ cm.$^{-1}$ and (b) no crack nor water leakage under a static hydraulic differential pressure of 0.5 kg./cm.². These properties (a) and (b) did not change even after 6 months' continuous static hydraulic differential pressure test and 6 months' continuous recycle test.

EXAMPLE 5

A 175 mesh cloth (free space content 45%) composed of 20 denier nylon 66 monofilaments was immersed in a mixed monomer liquid comprising 40 parts of divinylbenzene (purity 55%), 30 parts of 1-vinyl-2-methylimidazole, 30 parts of styrene and 0.3 part of benzoyl peroxide. The thus treated cloth was inserted between two nickel-plated thin iron sheets and irradiated with the electron accelerator of Example 4 at a total dose of $1 \times 10^7$ rad. at 2 mev. and 2 ma. Thereafter, the irradiated cloth was thermally polymerized at 40° C. for 20 hours, at 60° C. for 10 hours and at 95° C. for 10 hours to obtain a membrane-like graft polymeric substrate.

This substrate was quaternarized with a methyl iodide-acetone solution to prepare a quaternary pyridinium type anion-exchange membrane. The thus prepared membrane had a thickness of 0.13 mm. and showed, in 0.5 N NaCl at 25° C., (a) the required specific conductance, (b) a transport number from the membrane potential of 99%, (c) a bursting strength of 8.0 kg./cm.² and (d) no water leakage. These properties (a), (b), (c) and (d) did not substantially change even after 6 months' continuous static hydraulic differential pressure test and 6 months' continuous recycle test.

EXAMPLE 6

A 60 mesh plain cloth (free space content 30%), which had been woven from 60 denier polypropylene multi-filaments, was irradiated in vacuum for 10 hours with Co 60 at a dose rate of $5 \times 10^5$ rad./hr. Thereafter, the cloth was taken out in the air and allowed to stand for 3 days. The thus treated cloth was inserted between two polyester films and immersed in a separately prepared mixed monomer liquid comprising 40 parts of divinylbenzene (purity 55%), 25 parts of acrylic acid, 35 parts of styrene and 0.3 part of benzoyl peroxide. Subsequently, the cloth was thermally polymerized at 40° C. for 12 hours and at 95° C. for 12 hours to prepare a membrane-like graft polymeric substrate.

This substrate was treated at 70° C. for 20 hours in a 2 N NaOH alcohol-water mixed solution to obtain a carboxylic acid type cation-exchange membrane. The thus obtained membrane had a thickness of 0.26 mm. and showed, in aqueous 0.1 N NaOH at 25° C., (a) the required specific conductance and (b) no water leakage under a static hydraulic differential pressure of 0.5 kg./cm.². The above-mentioned properties (a) and (b) did not substantially change even after 6 months' continuous static hydraulic differential pressure test and 6 months' continuous recycle test.

For comparison, a membrane was prepared under the same conditions as above, except that the cloth was not irradiated. The water leakage of the thus prepared membrane was 2000 cc. m.² hr., and increased to about 8 times after 6 months' continuous recycle test.

The above-mentioned carboxylic acid type cation-exchange membrane was used for the electrolysis of sodium chloride carried out at a current density of 10 a./dm.², using 5 N NaOH as catholyte and aqueous 5 N NaCl as anolyte. As the result, (A) the current efficiency of sodium was 95% and (B) the leakage of Cl⁻ ion to the cathodic side was not observed at all. These characteristics (A) and (B) did not change at all even when the electrolysis was effected for 6 months under the above-mentioned conditions.

In contrast to this, in the case of the membrane prepared by use of cloth not irradiated, the leakage of Cl⁻ ion was observed from the beginnnig.

EXAMPLE 7

The same irradiated polypropylene cloth as in Example 6 was immersed in a mixed monomer liquid comprising 30 parts of divinylbenzene (purity 55%), 40 parts of butyl vinylsulfonate, 30 parts of styrene and 1 part of benzoyl peroxide. After removing the air contained therein, the cloth was inserted between two polyester films and then thermally polymerized at 60° C. for 20 hours and at 95° C. for 40 hours to obtain a graft polymeric substrate.

The thus obtained substrate was treated at 85° C. for 60 hours in a 2 N NaOH alcohol-water mixed solution to make a sulfonic acid type cation-exchange membrane. This membrane had a thickness of 0.24 mm. and showed, in a 0.5 N NaCl at 25° C., (a) the required specific conductance, (b) a bursting strength of 7.0 kg./cm.², (c) a transport number from the membrane potential of 95% and (d) no water leakage. The above-mentioned properties (a), (b), (c) and (d) did not substantially change even after 6 months' continuous static hydraulic differential pressure test and 6 months' continuous recycle test.

For comparison, a membrane was prepared under the same conditions as above, except that the cloth was not irradiated. This membrane showed, immediately after preparation, a water leakage of 4000 cc./m.² hr. and was not practically usable.

EXAMPLE 8

A 170 mesh plain cloth (free space content 30%), which had been woven from 20 denier polypropylene monofilaments, was irradiated in air at room temperature with Co 60 at a total dose of 1×10⁷ rad. Subsequently, the cloth was immersed in a homogeneous mixed monomer liquid comprising 3 parts of styrene-butadiene copolymer, 30 parts of divinylbenzene (purity 55%), 75 parts of styrene and 30 parts of dimethyl phthalate. After removing the air contained therein, the cloth was inserted between two polyester films and then thermally polymerized at 70° C. for 40 hours and at 95° C. for 40 hours to obtain a membrane-like graft polymeric substrate.

The thus obtained substrate was immersed in methanol at room temperature and then sulfonated at 40° C. for 15 hours with concentrated sulfuric acid (purity 98%) to prepare a cation-exchange membrane. This membrane had a thickness of 0.16 mm. and showed, in 0.5 N NaCl at 25° C., (a) the required specific conductance, (b) a bursting strength of 5.5 kg./cm.², (c) no water leakage and (d) a transport number from the membrane potential of 97%. The above-mentioned properties (a), (b), (c) and (d) did not substantially change even after 6 months' continuous recycle test.

EXPERIMENTAL EXAMPLE 2

The membrane-like graft polymeric substrate obtained in Example 8 was immersed in methanol at room temperature for 5 hours to remove the dimethyl phthalate and the like by extraction. Subsequently, the substrate was chloromethylated at 35° C. for 20 hours with chloromethyl ether containing 1% of zinc chloride and then aminated with a trimethylamine-methanol solution to prepare a quaternary ammonium type anion-exchange membrane. This membrane had a thickness of 0.17 mm. and showed, in 0.5 N NaCl at 25° C., (a) the required specific conductance, (b) a bursting strength of 5.0 kg./cm.², (c) no water leakage and (d) a transport number from the membrane potential of 98%. The above-mentioned properties (a), (b), (c) and (d) did not substantially change even after 6 months' continuous recycle test.

In contrast thereto, an anion-exchange membrane prepared in the same manner as above, except that the cloth was not irradiated, had a crack between the support and the resin portion and showed, immediately after preparation, a water leakage of 1500 cc./m.² hr.

We claim:

1. A substrate comprising a resin portion and a fabric support embedded therein, said resin portion completely filling spaces initially present to the extent of 10–90% by volume before graft polymerization and substantially equal in size and substantially uniformly distributed in the fabric support, said resin portion also being firmly bonded to the fabric by graft polymerization and comprising a cross-linked resin derived from at least one monomer having an ion-exchange group or a functional group capable of introducing an ion-exchange group and a cross-linking agent, said monomer being a monovinyl compound and said cross-linking agent being a polyvinylic compound; said substrate having the following characteristics:

(1) a resin content of about 20 to 80% by volume after graft polymerization;
 (2) a water leakage of substantially 0 cc./m.² hr. under a differential pressure of 0.5 kg./cm.²;
 (3) a specific conductance of 0.5 to 20×10⁻³ Ω⁻¹ cm.⁻¹ after introduction of said ion-exchange group;
 (4) a bursting strength of 1 to 10 kg./cm.², after introduction of said ion-exchange group;
 (5) characteristics (2), (3) and (4) being substantially unchanged when said substrate is formed into an ion-exchange membrane, even after 6 months of continuous testing carried out under conditions α or β set forth below and after six months of continuous static hydraulic differential testing carried out while switching every other day the condition α to the condition β:

| | One side of the membrane (kg./cm.²) | The other side of the membrane (kg./cm.²) |
|---|---|---|
| Condition α | 0.5 | 0 |
| Condition β | 0 | 0.5 |

2. The substrate of claim 1, wherein the support fabric is in the form of a woven fabric or a net-like fabric.

3. The substrate of claim 1, wherein the material of the support fabric comprises a polymer of an olefinic monomer.

4. The substrate of claim 3, wherein the olefin monomer is selected from the group consisting of ethylene, propylene or butene.

5. The substrate of claim 1, wherein the material of the support fabric comprises a polymer of a halogenated vinyl or vinylidene compound, an acrylic ester, or an ethylenically unsaturated monomer having a nitrile group.

6. The substrate of claim 5, wherein said polymer is a polymer of a monomer selected from the group consisting of vinyl chloride, vinylidene chloride, vinyl tetrafluoride, ethyl acrylate, methyl methacrylate, acrylonitrile and methacrylonitrile.

7. The substrate of claim 1, wherein the material of the support fabric comprises a polyester, polyamide or polyvinyl alcohol.

8. The substrate of claim 1, wherein said monomer is selected from the group consisting of a substituted or unsubstituted monovinyl aromatic hydrocarbon, a vinylidene compound, an ethylenically unsaturated suphonic acid or a derivative thereof, an ethylenically unsaturated carboxylic acid or a derivative thereof or a basic nitrogen-containing vinyl monomer.

9. The substrate of claim 8, wherein said monomer is selected from the group consisting of styrene, vinyl toluene, a haloalkylstyrene, vinyl sulphonic acid, acrylic, methacrylic, maleic, fumaric, vinylbenzoic or itaconic acid, or a salt, ester or amide of said acids.

10. The substrate of claim 1, wherein the cross-linking agent is selected from the group consisting of divinylbenzene, trivinylbenzene, divinylnaphthalene or butadiene.

11. The substrate of claim 1, wherein the substrate is further characterized as producing an ion-exchange membrane having a transport number of about 95% or greater.

12. A process for preparing a substate comprising a resin portion and a fabric support embedded therein, said substrate being capable of forming an ion-exchange membrane, which comprises impregnating a degasified polymeric fabric support having a free space content of 10 to 90% with a degasified liquid mixture comprising a monomer having an ion-exchange group or a functional group capable of introducing an ion-exchange group and a cross-linking agent, filling the free space with said mixture, shaping the filled support fabric into the form of a membrane, said monomer being a monovinylic compound and said cross-linking agent being a polyvinylic compound, then irradiating the filled support fabric with a high energy ionizing radation, and thereafter effecting further graft polymerization of the monomer and said support fabric by the application of heat to form a graft bonding therebetween.

13. A process for preparing a substrate comprising a resin portion and a fabric support embedded therein, said substrate being capable of forming an ion-exchange membrane which comprises immersing a fabric support of a polymeric material having a free space content of 10 to 90% in a liquid mixture comprising a monomeric compound having an ion-exchange group or a functional group capable of introducing an ion-exchange group and a cross-linking agent, said monomer being a monovinylic compound and said cross-linking agent being a polyvinylic compound filling the free space with said mixture; degasifying the filled support fabric, shaping the filled support fabric into the form of a membrane, then irradiating the filled support fabric with a high energy ionizing radiation and thereafter thermally graft polymerizing said monomeric compound to said support fabric wherein said resin portion is formed.

14. A process for preparing a substrate comprising a resin portion and a fabric support embedded therein, said substrate being capable of forming an ion-exchange membrane which comprises irradiating in air a support fabric of a polymeric material having a free space content of 10 to 90%, with a high energy ionizing radiation, coating the irradiated support fabric with a liquid mixture of a monomer having an ion-exchange group or a functional group capable of introducing an ion-exchange group and a cross-linking agent, said monomer being a monovinylic compound and said cross-linking agent being a polyvinylic compounding and said free space being filled with said mixture, and then subjecting the support to polymerization by the application of heat whereby said monomer forms the resin portion securely grafted to said support fabric.

References Cited

UNITED STATES PATENTS

| 2,956,899 | 10/1960 | Cline | 117—93.31 |
| 2,907,675 | 10/1959 | Gaylord | 117—93.31 |
| 3,088,791 | 5/1963 | Cline et al. | 117—93.31 |
| 3,008,918 | 11/1961 | Stanton et al. | 117—93.31 |
| 3,097,960 | 7/1963 | Lawton et al. | 8—DIG 18 |
| 3,101,276 | 8/1963 | Hendricks | 117—93.31 |
| 3,252,935 | 5/1966 | Thompson et al. | 117—93.31 |

RALPH S. KENDALL, Primary Examiner

J. H. NEWSOME, Assistant Examiner

U.S. Cl. X.R.

8—DIG 12, DIG 18; 117—98, 138.8 A